UNITED STATES PATENT OFFICE.

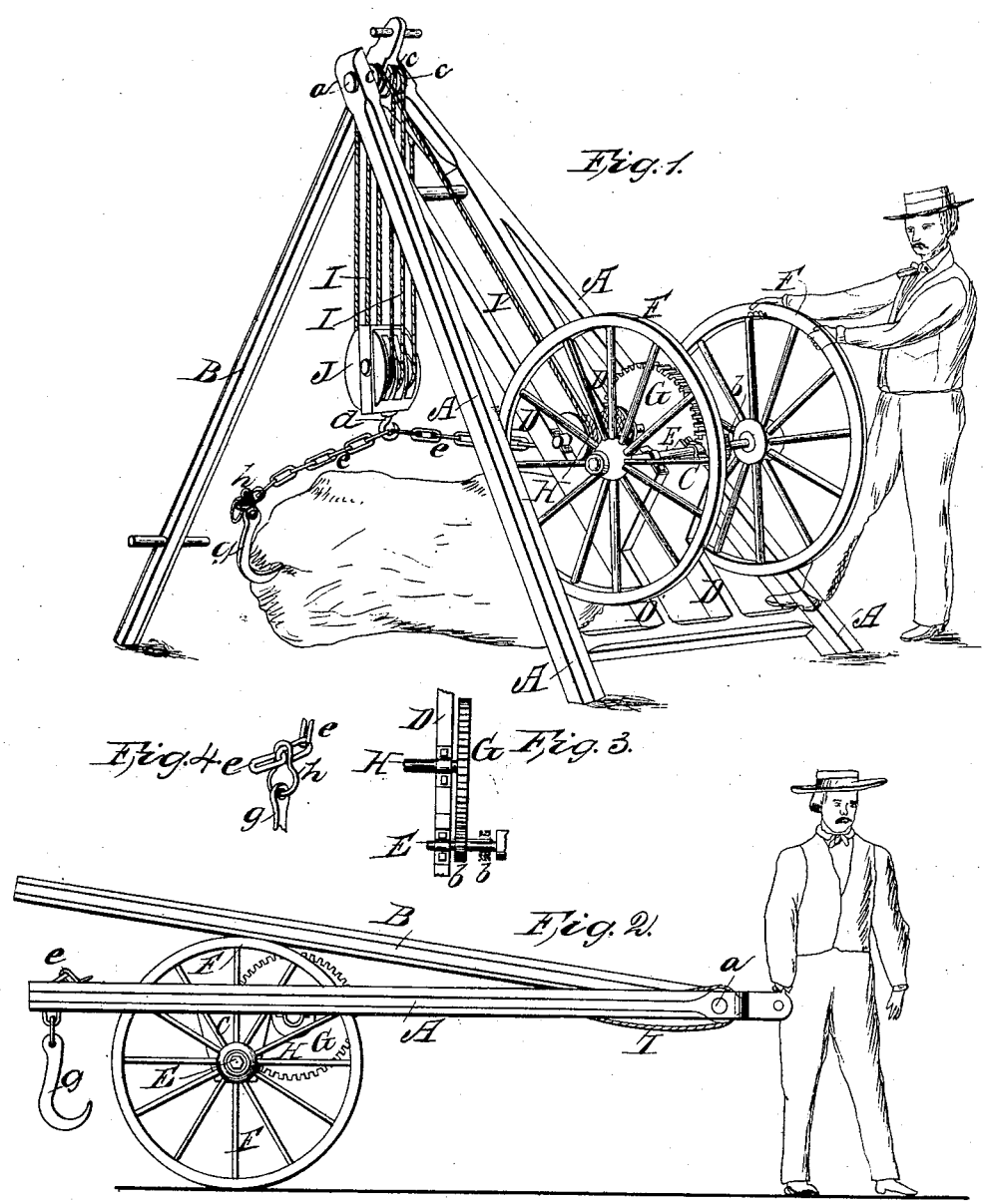

JAMES B. LYONS, OF MILTON, CONNECTICUT.

STUMP-EXTRACTOR.

Specification of Letters Patent No. 29,606, dated August 14, 1860.

*To all whom it may concern:*

Be it known that I, JAMES B. LYONS, of Milton, in the county of Litchfield and State of Connecticut, have invented certain new and useful Improvements in Machinery for Extracting Stones and Stumps; and I do hereby declare that the following is a full, clear, and exact description thereof, reference being had to the accompanying drawings, making part of this specification, in which—

Figure 1 represents a perspective view of the machine in operation. Fig. 2 shows a side elevation of the machine when closed up for transportation from place to place. Fig. 3 is a detail of the gear wheels. Fig. 4 is a view of the grapple hook with the adjustable chain eye attached to its shank.

Similar letters of reference indicate corresponding parts in all the figures.

This invention is intended for extracting large rocks that are buried in the surface of the ground without previously digging the earth away around them, and it is also intended for extracting old stumps, etc., in clearing off land for cultivation.

It consists in the employment of a jointed tripod framework, constructed of strong timber and suitably braced, to which are applied pulleys, a block and tackle, grapple hooks, a capstan and two large hand wheels which answer the purpose of carriage wheels for moving the frame about from place to place; all as will be hereinafter described.

To enable those skilled in the art to fully understand my invention I will proceed to describe its construction and operation.

In the drawings A, A, are two pieces of timber that are connected together by brace rods in a suitable manner in the shape of a triangle, through the top ends of this triangular frame passes a strong rod $a$, to which is jointed the prop leg B, forming with A, A, a tripod frame, shown by Fig. 1 in an upright position, the legs A A, and B, of which are capable of being extended or contracted giving to the entire frame a greater or less base, as occasion may demand. This frame may be of any size or strength according to the work to be performed with it.

C, C are two bearing blocks that are secured to the two intermediate parallel brace timbers D, D, and E is a shaft or axle having its bearings in said blocks C, C, that carries on each end a large wide rimmed wheel F, both of which are keyed to the axle.

$b$ is a pinion spur wheel placed on the axle E, and attached to it by a key tenon so that it may be moved laterally only, on this axle; said pinion engages with the teeth of a large spur wheel G, that is keyed to the shaft of a flanged drum or capstan H, which has its bearings on the bars D, D. Thus when the frame is set up in an erected state, the pinion $b$, being brought into gear with the wheel G, and the wheels F, turned by hand, the drum H will be rotated very slowly compared with the movement of these wheels F, for while they make several turns the drum will make only one. This proportion of speed may of course be increased by using a larger pinion ($b$) or a smaller spur wheel (G) but for the purposes of this machine time is of less importance than power, and therefore a very slow motion is desirable.

I is a strong hempen rope or chain that is wound upon the drum H, it passes up to the top of the frame and over a pulley $c$, thence down and through a three sheave block J, and over two other pulleys $c$, $c$, at the top of the frame forming the tackle. From the swivel block hook $d$, chains $e$, $e$, are hung and to each chain is attached a grapple hook $g$, which may be adjusted so as to lengthen or shorten the chains according to the diameter of the rock to be operated upon, by means of eyes $h$, $h$, to which the shanks of the hooks are attached. These eyes consist of a circular portion large enough to slip freely along the chains, and a narrow oblong portion that will not allow the chain to pass through it. With these eyes the hooks may be adjusted with great facility without taking up the chains.

The operation of this machine for loosening and raising large rocks or stumps of trees is, to attach the grapple hooks, they being properly adjusted to the object to be raised, and after properly establishing the legs of the frame the wheels F, are turned by one or two men and as the chain is wound up on the drum H, the block rises slowly, and brings with it the buried stone or stump. After it is raised a suitable height a drag may be placed under it for further removal.

The machine has now been described when in an erected state for the operation of loosening rocks, etc., and now, when the work is done, the leg B, is folded over on the frame A, A, and the machine is brought to a horizontal position, represented by Fig. 2, and thus resting on wheels F, it may be drawn about from place to place, the wheels serving in this case for carriage wheels, the pinion $b$, must be disengaged from the wheel G, before the machine is moved.

Having thus described my invention what I claim as new and desire to secure by Letters Patent, is—

The combination with a jointed frame A, A, and B, as described of the wheels F, F, serving a two-fold purpose, gear wheels $b$, G, drum H, pulleys $c$, $c$, $c$, and block and tackle I, J, all arranged and made to operate in the manner and for the purposes herein described and represented.

JAMES B. LYONS.

Witnesses:
H. G. WELCH,
D. T. WELCH.